United States Patent [19]
Hong

[11] 3,845,466
[45] Oct. 29, 1974

[54] SYSTEM AND METHOD FOR CHARACTER RECOGNITION

[75] Inventor: Jung Pyo Hong, Santa Monica, Calif.

[73] Assignee: California Institute of Technology, Pasedena, Calif.

[22] Filed: July 31, 1972

[21] Appl. No.: 276,599

Related U.S. Application Data

[63] Continuation-in-part of Ser. No. 90,584, Nov. 18, 1970, abandoned.

[52] U.S. Cl. ..................340/146.3 S, 340/146.3 H, 340/146.3 Y

[51] Int. Cl. .............................................. G06k 9/12

[58] Field of Search ............340/146.3 S, 146.3 G, 340/146.3 Y, 146.3 AQ

[56] References Cited

UNITED STATES PATENTS

| | | | |
|---|---|---|---|
| 3,255,436 | 6/1966 | Gamba | 340/146.3 G |
| 3,297,989 | 1/1967 | Atchley et al. | 340/146.3 G |
| 3,323,407 | 6/1967 | Gamba | 340/146.3 AQ |
| 3,381,274 | 4/1968 | Quade et al. | 340/146.3 Y |

*Primary Examiner*—Gareth D. Shaw
*Assistant Examiner*—Leo H. Boudreau
*Attorney, Agent, or Firm*—Lindenberg, Freilich, Wasserman, Rosen & Fernandez

[57] ABSTRACT

A character recognition system is disclosed in which each character in a retina, defining a scanning raster, is scanned with random lines uniformly distributed over the retina. For each type of character to be recognized the system stores a probability density function (PDF) of the random line intersection lengths and/or a PDF of the random line number of intersections. As an unknown character is scanned, the random line intersection lengths and/or the random line number of intersections are accumulated and based on a comparison with the prestored PDFs a classification of the unknown character is performed.

9 Claims, 25 Drawing Figures

SYSTEM AND METHOD FOR CHARACTER RECOGNITION

CROSS-REFERENCES TO RELATED APPLICATION

This application is a Continuation-In-Part of application Ser. No. 90,584, filed Nov. 18, 1970, now abandoned.

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The present invention relates to a pattern recognition system and, more particularly, to an improved system for recognizing alphanumeric characters or the like.

2. Description of the Prior Art

Many pattern recognition systems for alphanumeric characters or the like have been proposed, and several are presently in use. In general, pattern recognition is a two-step process. First, measurement or data must be obtained from the character to be recognized. Then, a decision is made to which classification the data belongs. Typically, the character to be recognized is scanned to obtain the data. Scanning is typically with zig-zag or parallel scanning lines or by an array of sensors. The predetermined scan technique is subject to severe alignment constraints. That is, the character must be accurately positioned in the retina or scanned area. Any translational or rotational displacement of the character or any change in the character's dimensions result in recognition errors or increased recognition effort. Thus, a need exists for a character recognition system based on a new measurement and classification procedures.

OBJECTS AND SUMMARY OF THE INVENTION

It is a primary object of the present invention to provide a new character recognition system.

Another object is to provide a pattern recognition system with a new character measurement technique.

A further object of the invention is to provide a character recognition system with a new character classification technique.

Still a further object is to provide a character recognition system which is not affected by movement of the character in the scanned retina.

These and other objects of the invention are achieved by providing a character recognition system in which the character is scanned with random lines to generate for each character a probability density function (PDF) of the random line intersection lengths. The PDF for each scanned character is used in the character classification. Basically, the system uses a flying spot scanner and a feedback shift register to generate random lines which criss-cross a character in a retina. The output of a photosensitive device, positioned with respect to the retina is used to provide an indication of scanning line intersection lengths. This output, accumulated over a scanning period of time, is the empirical probability density function (PDF) of the character. The PDF is unique for the specific character.

The novel features of the invention are set forth with particularity in the appended claims. The invention will best be understood from the following description when read in conjunction with the accompanying drawings.

DESCRIPTION OF THE PREFERRED EMBODIMENTS

Figure 1A:
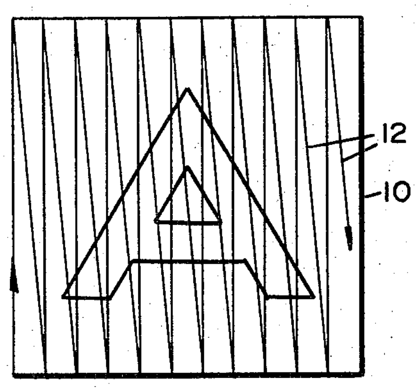
FIGS. 1*a*–1*e* are useful in explaining the limitations of the prior art.
Figure 1B:
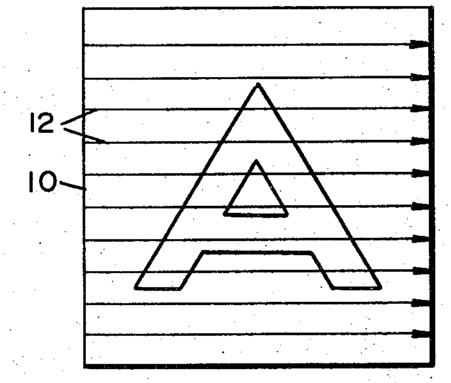
Figure 1C:
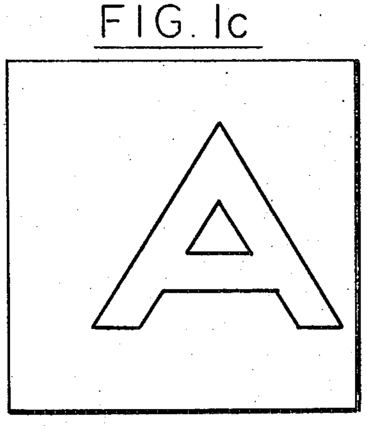
Figure 1D:
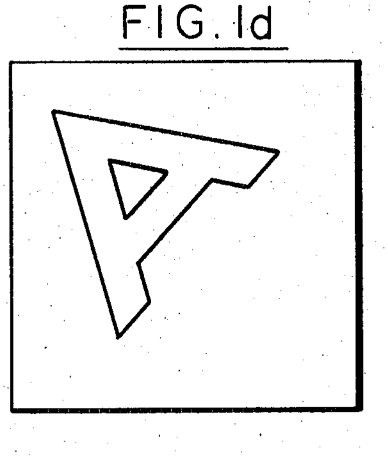
Figure 1E:
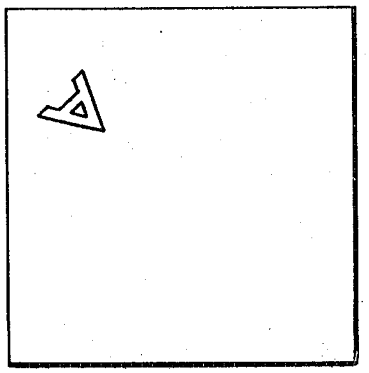

The present invention may best be explained by first referring to FIGS. 1*a*–1*e* which are useful in explaining prior art scanning techniques and problems encountered in such prior art pattern recognition systems. FIGS. 1a and 1b represent the character A on a retina 10, scanned by zig-zag and parallel lines 12, respectively. Such lines represent the techniques typically used in the prior art. In such systems character alignment is very critical. These systems cannot tolerate character translational displacement (FIG. 1*c*), rotational displacement (FIG. 1*d*) or change in character size (FIG. 1*e*) which can be thought of as a result of 'third-dimensional motion', without character realignment or excessive time consuming and expensive computation in the decision algorithm.

Figure 2:
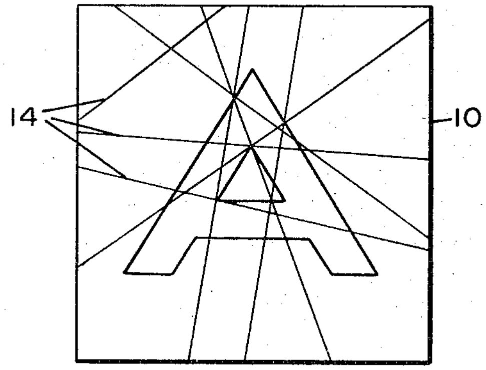
FIG. 2 is a diagram of the scanning technique of the present invention.

Such alignment or registration problems are eliminated by the present invention in which the character is scanned by random lines 14 (FIG. 2) which criss-cross the character on the retina. Although the lines 14 are random, they are assumed to be uniformly distributed over the entire retina area. In one embodiment, the intersection length of each random line is measured and a PDF is generated for the entire character. The character is scanned with a sufficient number of lines to generate an emperical PDF. This PDF is then compared with PDFs of known characters, and based on this comparison the character is recognized.

Figure 3A:
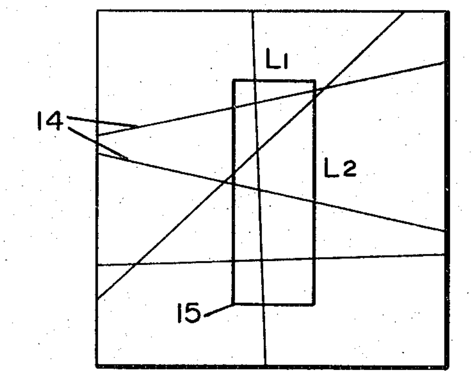
FIGS. 3*a*–3*d* and 4*a*–4*d* are diagrams useful in explaining the present invention.
Figure 3B:
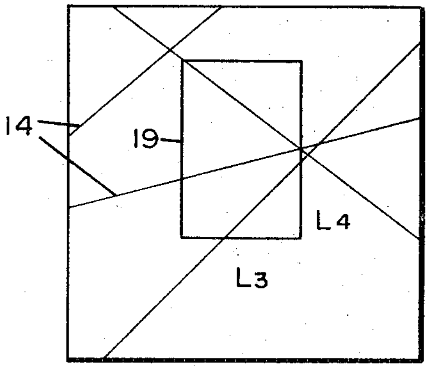
Figure 4A:
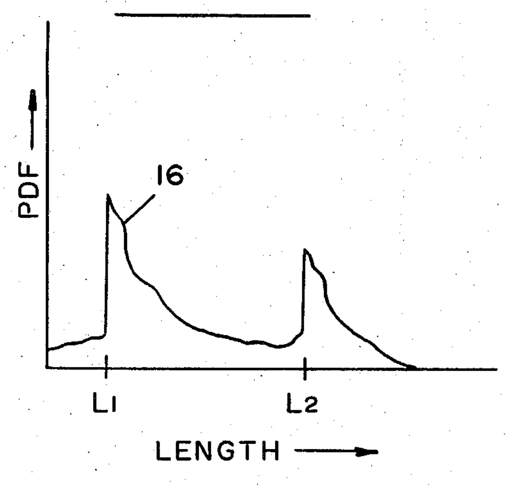
Figure 4B:
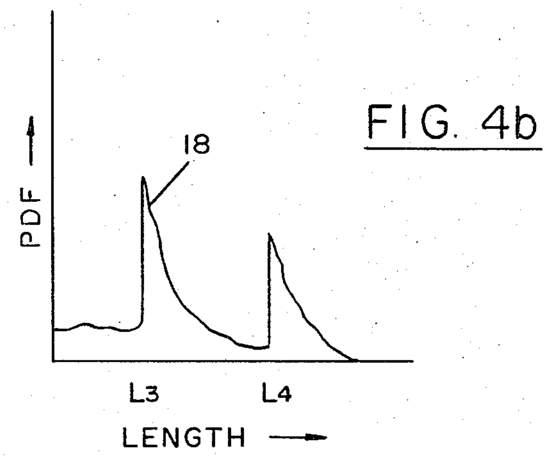

The latter aspect of the invention may better be explained in connection with FIGS. 3*a*–3*d* and 4*a*–4*d*. FIG. 3a represents a rectangle 15 of a width L1 and a length L2. It should be appreciated that the probability that the rectangle 15 will intersect a line across its full width is greater than the intersection of a line across its full length. Thus, the PDF for rectangle 15 has a PDF 16 as shown in FIG. 4*a*, wherein the peak value of the PDF at L1 is significantly greater than that at L2. A somewhat different PDF 18 (FIG. 4*b*) is produced for the rectangle 19 (FIG. 3*b*) in which the ratio of length to width is less than the ratio for rectangle 15. The PDF 20 in FIG. 4*c* is for the character L in FIG. 4*c*, while the character H in FIG. 3*d* can be assumed to produce a PDF 22, shown in FIG. 4*d*.

In accordance with the teachings of the present invention, the PDF for each character to be recognized is first generated. This may be done by scanning a known character and accumulating the lengths of all the intersected line for a sufficiently long sampling period. However, once the PDFs for all known characters are generated, they are permanently stored for comparison with PDFs generated by scanning unknown characters. In one particular embodiment the PDFs for the various characters were generated with the aid of a Scientific Data System 930 computer.

Figure 5:
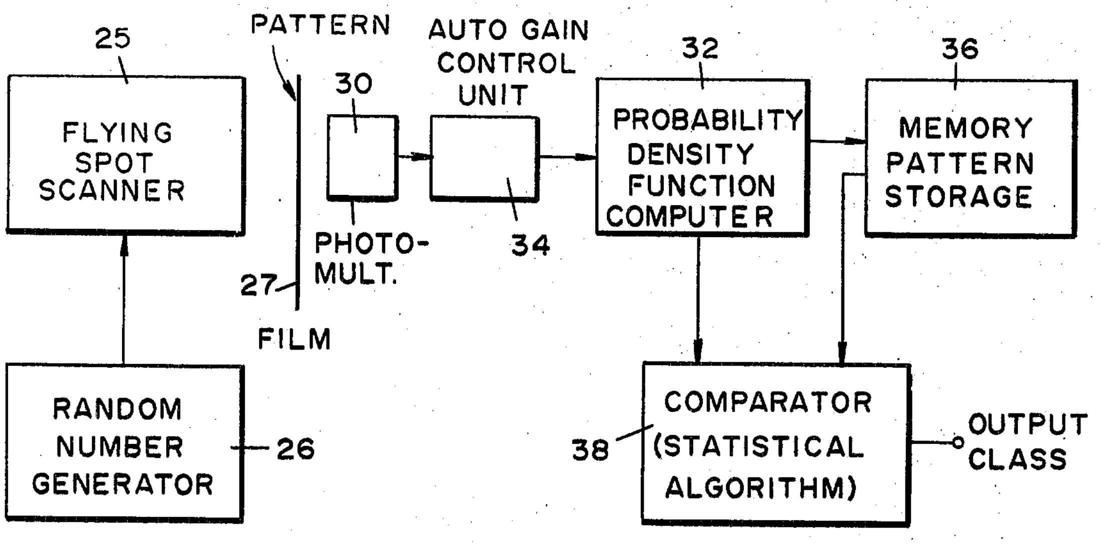
FIG. 5 is a basic block diagram of the present invention.

Reference is now made to FIG. 5 which is a block diagram of the present invention. It comprises a flying spot scanner 25 which is controlled by a random number generator 26 to produce random scanning lines. These lines scan a character in a fixed chosen area or retina on a film 27. The intersections of the lines by the patterns are sensed by a photosensitive element 30. The output of element 30 is supplied to a probability density function computer 32 through an automatic gain control (AGC) unit 34. Computer 32 in essence accumulates the line intersection lengths to thereby generate the PDF as the character is being scanned. Its output is compared with the output of a memory 36 in which the PDFs of all known characters are stored. The comparison is performed by a comparator 38. When the PDF, accumulated in computer 32, matches any of the PDFs in memory 36 to a sufficient degree which depends on the tolerable recognition error, the comparator 38 provides an output. Thus, the PDF in memory 36 which matches the one provided by computer 32 indicates the recognized character.

Herebefore it was assumed that each unknown character is scanned with a number of lines sufficient to generate a complete PDF therefor. It should be stressed that the recognition process can be increased significantly by scanning each character with less than the number of lines needed for the generation of a complete PDF. In such a case sequential probability ratio tests or other statistical methods may be employed to minimize the number of lines with which a character has to be scanned for its recognition. The principles of sequential probability ratio tests are well known. They are discussed in the literature including such books as "Mathematical Statistics" by S. S. Wilks and "Sequential Analysis" by A. Wald, both published by Wiley, New York.

It should be stressed that in the absence of the AGC unit 34, the system shown in FIG. 5 is not dependent on the translational or rotational motion of the character since the character is scanned with random scanning lines. Thus its absolute position is independent with respect to the retina 30. However, third-dimensional motion, i.e., character size variations have to be accounted for since the line intersection lengths would vary for the same character but of different sizes. This is achieved by the AGC unit 34 which varies the gain or amplification factor as a function of character size.

Herebefore, it was assumed that the PDF is generated as a function of line intersection lengths. If desired, the measurement criteria can be changed to be based on the number of times each line is intersected by the character. Thus, for the examples shown in FIGS. *3a–3d*, it is apparent that when scanning a rectangle, each scanning line can be intersected not more than once. However, the character L (FIG. *3c*) can intersect a line twice, while certain lines would be intersected as many as three times by the character H (FIG. *3d*). Furthermore, character recognition can be based on comparisons with PDFs based both on line intersection lengths and the number of intersections per line.

Figure 6:
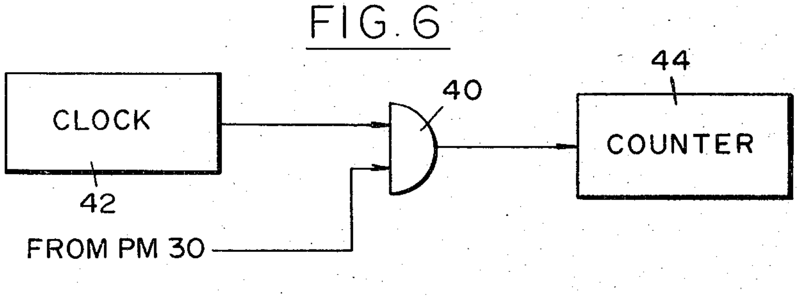
FIGS. 6 through 11 are diagrams useful in further explaining the teachings of the present invention.

Although the foregoing description is believed to be sufficient for those familiar in the art to practice the invention the following description is added for further clarification, if needed. The manner in which a PDF is generated for a character, such as that of the letter L, shown in FIG. 3C, will be explained in connection with FIGS. 3C, 6 and 7. It is assumed that whenever the letter is scanned by a line the output of the photomultiplier 30 (FIG. 5) is high and is low when the background is scanned. The high output of the photomultiplier is used to enable a gate 40 (FIG. 6) so that pulses from a clock 42 are counted in counter 44.

It should be apparent that during scan line L1, the photomultiplier output will be low during the entire line since line L1 does not intersect the letter L. Thus, at the end of line L1 the count in counter 44 would be zero. This number is stored in computer 32. During line L2 the output of 30 would be high during the period designated by arrow 51 in FIG. 3C. Thus, during this period gate 40 is open and the pulses from clock 42 are counted. Let it be assumed that at the end of L2 the count is 50. It is also stored in computer 32. During L3 the output of PM 30 is high during the period designated by arrow 52. Since arrow 52 is longer than arrow 51, the count accumulated during L3 is greater than that accumulated during L2. This count is also stored in computer 32.

Figure 3C:
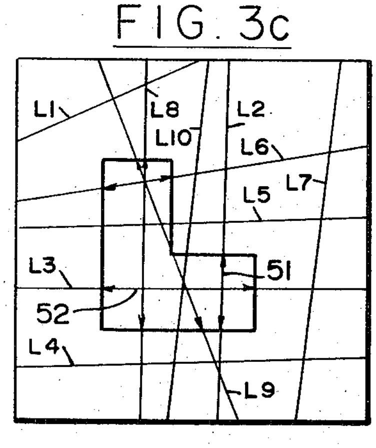
Figure 3D:
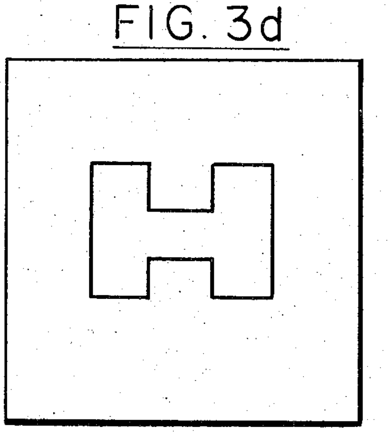
Figure 4C:
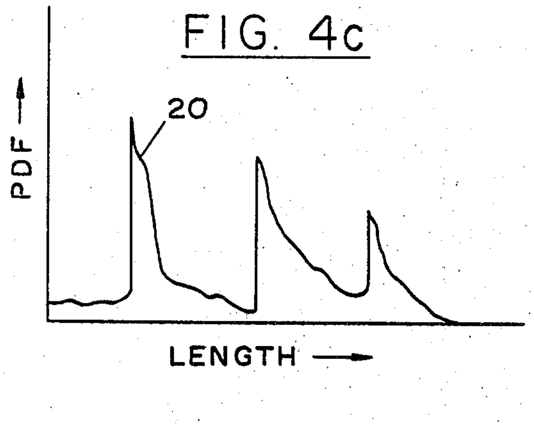
Figure 4D:
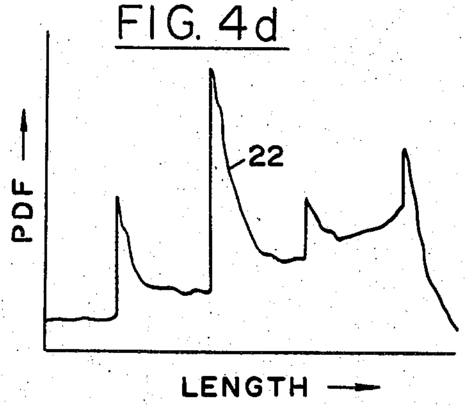
Figure 7:
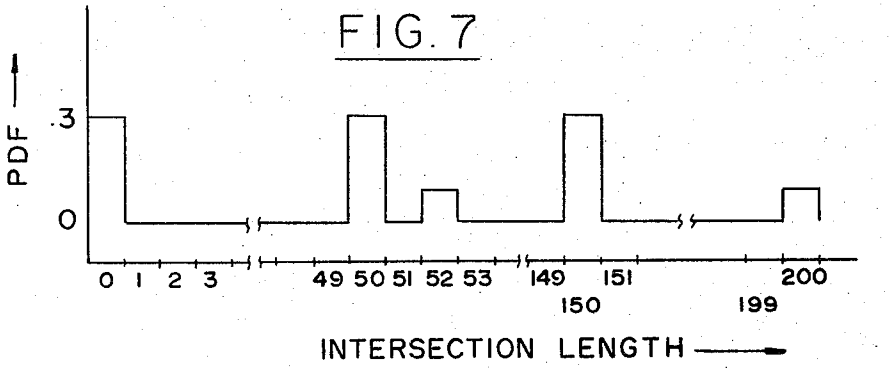

Based on the pattern shown in FIG. 3C, let it be assumed that the numbers stored in computer 32, representing the intersection lengths produced by lines L1-L10, are 0, 50, 150, 0, 50, 52, 0, 150, 200, 50. After all the numbers are stored, computer 32 generates the PDF. Basically, it determines how many times each number 0, 1, 2, etc., was stored. For the above example a number of 3 is generated for the intersection length 0, since three of the lines (L1, L4 and L7) produced intersection lengths of 0. A number 3 is generated for the intersection length 50, 1 for intersection length 52, 2 for intersection length 150 and 1 for intersection length 200. Thus, the set of numbers which is generated in the computer for intersection lengths 0, 50, 52, 150 and 200 is 3, 3, 1, 2, 1. For all other intersection length numbers, e.g., 1–149, 50, 53–49 and 151–149 the numbers which are generated are zero, since these intersection lengths were not experienced at all. These numbers are normalized by dividing each by the number of scan lines, i.e., 10 in the present example. Thus, the PDF for intersection lengths 0, 50, 52, 150 and 200 is ·3, ·3, ·1, ·2 and ·1 and zero for all others. That the PDF can be diagrammed as a two dimensional graph, such as that shown in FIG. 4C, is obvious. For the particular example the PDF is shown in FIG. 7.

Figure 8:
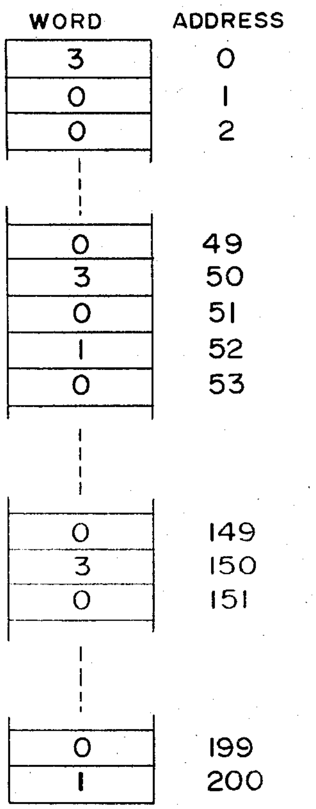

The above operation may be simplified as follows. The computer may include a table consisting of a number of words corresponding to the longest expected intersection length. Assuming it is 200 the table would include 201 words. Then, as each count is obtained in the counter, at the end of each scan line, it is used to address the word in the address corresponding thereto and the word therein is incremented by one. For example, after L1, since the number is zero, the word at address zero is addressed and incremented by one. After L2, since the number is 50, the word at address 50 is incremented by one. After L4, since the number is zero, the word at address zero is incremented again by one. However, since a 1 was already stored therein after L1, it is incremented from 1 to 2. Thus, after scanning the character with all the scanning lines the numbers in the table at addresses 0, 50, 52, 150 and 200 are 3, 3, 1, 2 and 1, which after normalization (by 10) are equal ·3, ·3, ·1, ·2 and ·1. The rest of the words in the other addresses are zeros. The entries at addresses 0-200 before normalization are shown in FIG. 8.

That such PDFs could be generated for known characters should be apparent. These PDFs, i.e., tables of numbers for known characters are stored permanently in storage 36. Then, as an unknown character is scanned its PDF is generated and is compared with the known PDFs. The comparison is done in comparator 38. Basically, it compares the entries or words in the table of the generated PDF with the entries in the tables of the PDFs in storage 36. When the generated PDF compares to any of the stored PDFs to within selected comparison criteria the scanned character is identified. Basically, comparator 38 performs functions similar to those of a simple two-word comparator except that it (38) compares groups of words rather than individual words.

Figure 9:
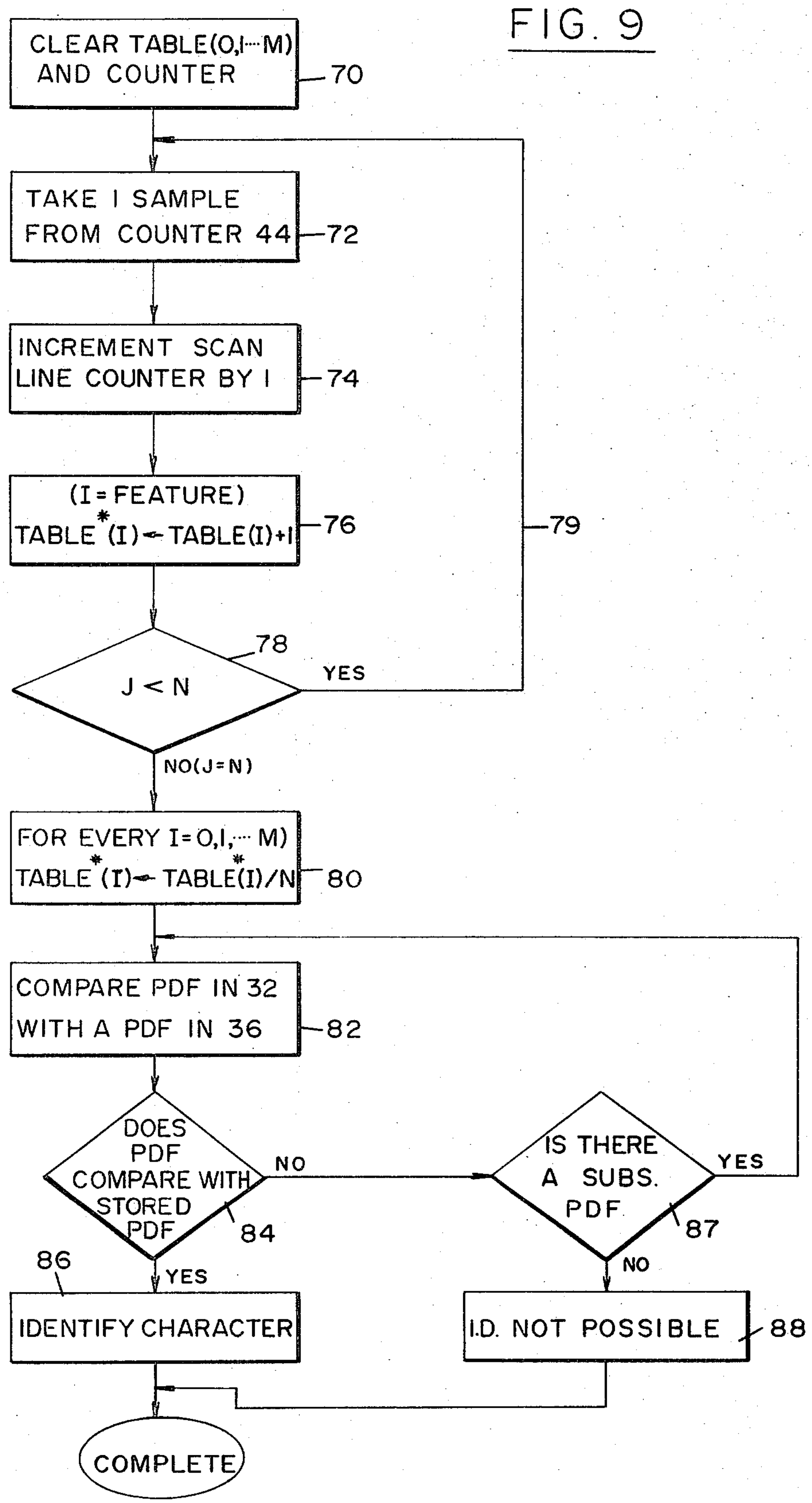

The operation may be summarized in connection with the flow chart shown in FIG. 9. Let it be assumed that the number of scan lines is N, and that the longest expected intersection length is M, the computer 32 includes M+1 words at addresses O through M, representing a table. It also includes a scan line counter. First, the table is cleared, as represented by block 70. Also, the scan line counter is cleared. Then, at the end of each scan line a sample, i.e., the count or number from counter 44 is taken. This is represented by block 72. Also, the scan line counter is incremented by one as represented by block 74. The running count in the scan line counter is represented by J. Then, the word at the sample address is incremented by one. This is represented by block 76, wherein the sample is designated by I. Then a check is made of the scan line counter as represented by block 78. If J<N it indicates that scanning is not complete and therefore a subsequent sample is to be taken as represented by line 79. If however, J=N, i.e., the scanning is completed, each entry in the table is normalized by dividing it by N, as represented by block 80.

Thereafter, the PDF in computer 32 is compared by comparator 38 with the first PDF in storage 36 (block 82). As previously stated, various comparison criteria may be used. For example, the PDF in computer 32 may be deemed to match a PDF In the storage 36 if X words in one PDF match to within selected limits X corresponding words in the other PDF. After the comparison an inquiry is made whether the generated PDF (in computer 32) compares with a PDF in storage 36 (block 84). If it does, the character is identified (block 86) and the routine is completed. If it does not an inquiry is made whether a subsequent PDF is stored in storage 36 (block 87). If the answer is yes, the succeeding stored PDF is compared with the generated PDF. If however, the answer is no, it indicates that none of the stored PDFs compares with the generated PDF. Thus, identification is not possible. This fact is indicated (block 88), such as by illuminating a light in the computer panel and the routine is completed.

In the foregoing example N=10, as previously explained, the first sample due to L1 is zero. It is taken by computer 32 (block 72), and the scan line counter is incremented by 1 from 0 to 1 (block 74). Then, the word at address 0 is incremented by 1 (block 76). Also, the scan line counter is interrogated (block 78). Since its count is 1 which is less than 10, the next sample is taken at the end of scan line L2. Assuming that the sample, i.e., the number in counter 44 after L2 is 50, the word at address 50 is addressed and incremented by 1 (block 76). Then the scan line counter is interrogated. Since after L2 its count is now 2, which is less than 10 (N=10) a next sample is taken after the completion of the next scan line, i.e., line L3, and the process is repeated. After L10, the process is also repeated. Then when the scan line counter is interrogated (block 78) since J=N=10, it indicates that scanning was completed. Therefore, instead of returning to block 72, block 80 is executed. That is, all the entries are normalized by dividing each entry in the table by N.

Figure 10:
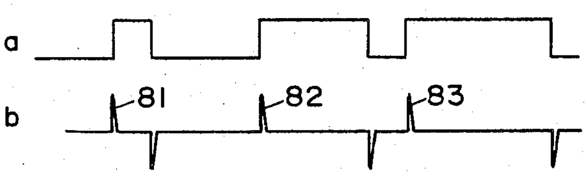

Herebefore it was assumed that the PDF is generated by intersection lengths. Clearly as herebefore pointed out, the PDF can be generated for the number of times each scan line intersects the character. This can be achieved by simply differentiating the change of output of the PM 30 from low to high each time a character is crossed to produce a positive pulse to be counted by counter 44. In FIG. 10, line *a*, the output of the PM 30 for three intersections during a single scan line is shown. In line *b*, the output after differentiation is shown with three positive pulses 81, 82 and 83 which may be counted by counter 44. The negative pulses are ignored.

Also herebefore it was assumed that the comparison of the generated PDF with the PDFs, stored in storage 36, is performed after the scanning of the character with all the N scan lines. As previously pointed out, comparison may be performed after each sample is added to the generated PDF. The comparison with the stored PDFs may be performed based on sequential probability ratio tests or other statistical methods. If the character is identified, i.e., its PDF compares with a PDF of known character based on selected comparison criteria, the identified character need not be scanned with additional lines. Thus, the scanning process can be shortened. If however, the generated PDF does not compare with any of the stored PDFs an additional sample is taken up to N samples. Thus, unless identification is achieved with N or less samples, the character cannot be identified.

Figure 11:
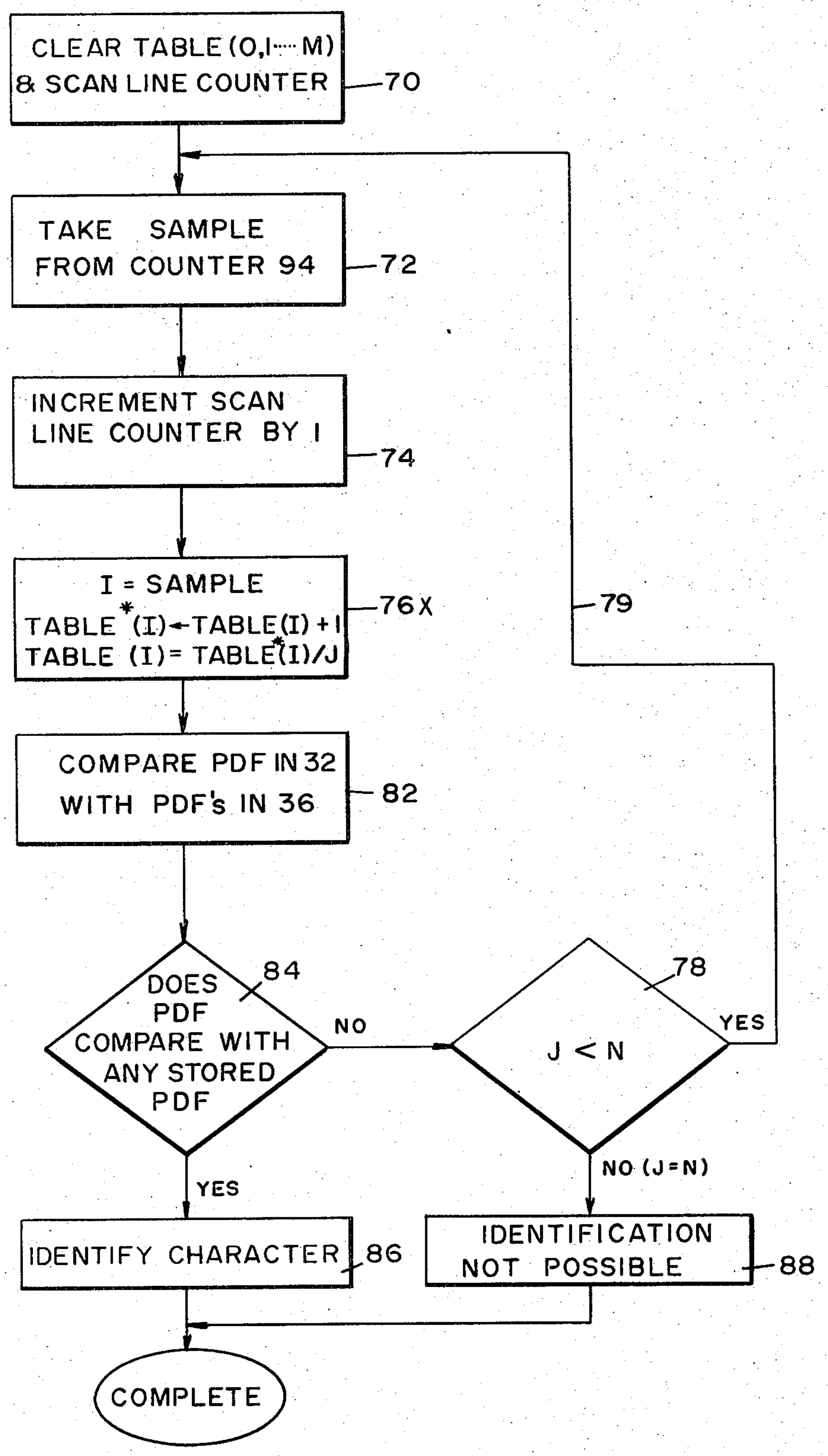

The modified flow chart for such an arrangement is shown in FIG. 11. Basically, the stelps represented by blocks 70, 72 and 74 are the same as those previously described. However, instead of incrementing each word at address I by 1 as shown by block 76 in FIG. 9, in FIG. 11 the operation is represented by block 76*x*. Basically, the word at address I of a first table, designated by an asterisk (*) is incremented by one. Then it is normalized by dividing it by J, where J represents the number of the last scanned line. Then the normalized value is entered into a second table, designated without the asterisk.

Then the comparison is performed (block 82), and the inquiry is made whether comparison was achieved (block 84). If it was, the character is identified (block 86) and the routine is complete. If it was not, the scan line counter is interrogated (block 78). If J<N another sample is taken. If however, J=N it indicates that the character was scanned by N lines and yet no comparison was achieved. Therefore identification is not possible (block 88) and the routine is completed.

Herebefore it was assumed that no prior information about the character is known. Therefore as shown by blocks 70 in FIGS. 9 and 11 the table and the scan counter are cleared. If some information is available it can be prestored in the table and thereby reduce the number N representing the maximum number of lines necessary to scan the character.

Figure 12:
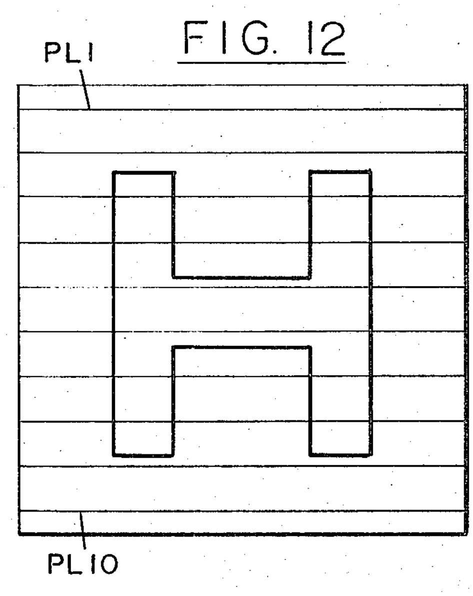
FIGS. 12 through 15 are diagrams useful in explaining another basic embodiment of the invention.

It has been discovered a PDF for a character scanned with random lines, as heretofore described, can be generated by scanning the character with parallel lines with a TV camera or the like, and then operate on the received data to produce samples which are the same as if the character was scanned with random lines. This aspect of the invention may best be explained in connection with FIGS. 12–15. In FIG. 12 the letter H is shown. It is assumed to be scanned by a plurality of parallel lines which for simplicity are limited to 10 and are designated PL1–PL10. The scanning may be achieved by a TV camera 90 (FIG. 13) or the like whose output during each scan line is digitized by a digitizer 92 to provide a value of one when the letter is scanned and a value of zero when the background is scanned.

Figure 14:
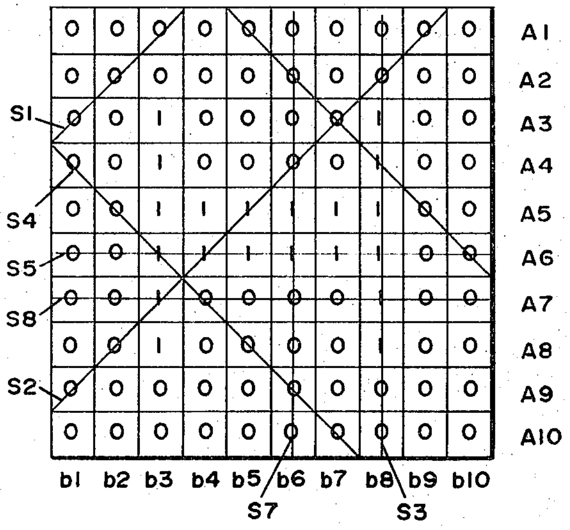
Figure 13:
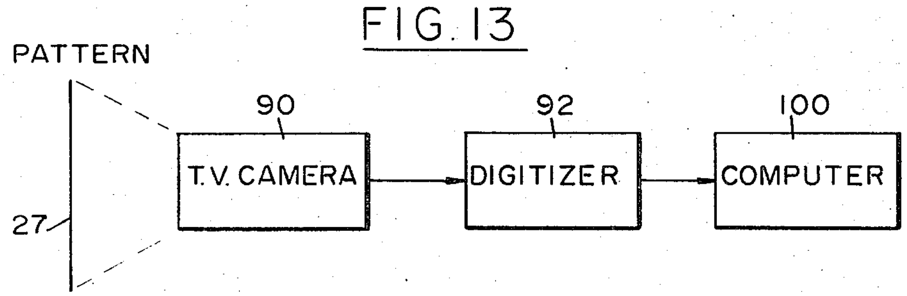

Assuming a resolution of 10 for each line, the 10 binary digits or bits generated during each line and representing a separate word are stored in a separate address in a computer designated in FIG. 13 by numeral 100. The 10 words which would be stored for the letter H are represented in FIG. 14, where the bits ar designated *b*1–*b*10 and the word addresses A1–A10. It should be apparent that the stored words from a 10 × 10 matrix or array of bits representing the scanned character H. The array shown in FIG. 14 is only for the particular letter H which is aligned vertically with respect to the scan lines PL1–PL10. Clearly if the letter H were tilted a different array of bits would result.

Figure 15:
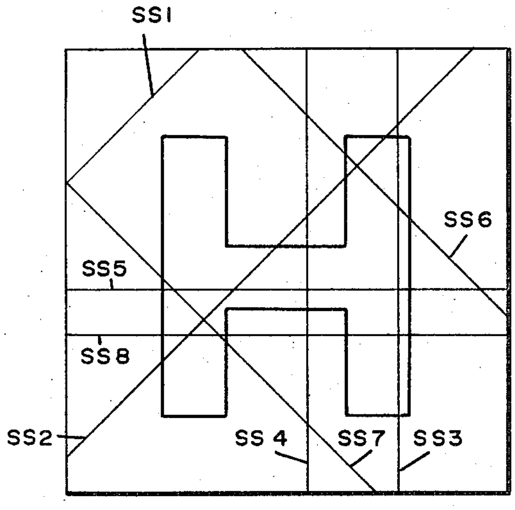

In accordance with the present invention this problem is overcome by using the array to provide samples as if the character was scanned with uniformly distributed random lines. This is achieved by using the array to read out different combinations of bits along different straight lines on the array and counting the number of ones along each line. In FIG. 14, eight such lines are shown and are designated by S1–S8. These lines are analogous to scanning the letter H with eight random lines as shown in FIG. 15. Clearly, when the bits along line S1 are read out and the number of ones are counted the count is zero. This is analogous to scanning the letter H with random lines SS1 (FIG. 15) and not intersecting the letter. Thus, the count of ones accumulated during the readout of bits along each of the lines on the array is analogous to the output of the counter 44 when random line scanning is employed. For the particular example shown in FIG. 14, the numbers derived for lines S1-S8 are 0, 3, 6, 1, 6, 1, 2 and 2. Each of these numbers is used as a sample in the same way that each count accumulated in counter 44 after each scan line is used in the foregoing described embodiment, to generate the PDF for the scanned character. Once the PDF is generated, it is compared with the stored PDFs for character identification, as herebefore described.

It should be appreciated by those familiar with the art that computer 100 may be programmed to first receive each 10-bit word from the digitizer for each scan line to form the array of bits for the scanned character shown in FIG. 14. Then the computer is programmed to read bits across different lines of the array and determine the number of bits along each line which are ones. This number is the sample which is used in deriving the PDF. By reading across the array along different uniformly distributed random lines, the computer array is scanned in a manner analogous to scanning a character with random lines.

It should be apparent that in practice the array which is stored in the computer 100 is much greater than 10 × 10. The actual number of bits per word and the number of words depend on the desired resolution. That the array contains character information based on scanning a character with parallel lines should be obvious from the foregoing description.

It is thus seen that in accordance with the present invention the character recognition can be achieved in either of two ways. It can be achieved by scanning the actual character, i.e., its actual pattern with random lines to derive the various numerical samples. Likewise, it is achievable by scanning the character pattern with parallel lines to produce the array which is in turn scanned by the random lines. Either the actual character pattern or its analogous array represent the properties or caracteristics of the character to be recognized.

The particular computer 100, which is employed, dictates the program which need be executed to perform the recognition processes as herebefore described. Based on the foregoing description, various programs can be written by those familiar with the art in practicing the invention.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A character recognition system for identifying substantially every character in a set of preselected characters comprising:

first means for storing for each type of character to be identified a probability density function, which is a function of the character and its intersections with uniformly distributed random straight scanning lines, each straight scanning line being sufficiently long to scan across the character from one end thereof to the other;

second means including flying spot scanning means for scanning a character to be recognized with a plurality of uniformly distributed random straight scanning lines, each straight scanning line being sufficiently long to scan across the entire character from one end thereof to the other, and for deriving on the basis of the intersections of said scanned character by said straight scanning lines a probability density function for said character; and third means coupled to said first and second means for comparing the probability density function derived in said second means for said scanned character with the probability density functions stored in said first means and for substantially identifying the scanned character when its probability density function from said second means substantially matches any of the probability density functions in said first means.

2. A character recognition system as recited in claim 1, wherein said scanning means scan said character to be recognized with random straight lines uniformly distributed over a fixed retina-defining area containing said character, the portion of the area not covered by said character representing character background.

3. A character recognition system as recited in claim 2 wherein said first means store for each type of character to be recognized a probability density function which is a function of the intersections of the character and uniformly distributed random straight scanning lines which scan said character, and said second means store said probability density function for the scanned character to be recognized as M+1 words, where M is the largest number of intersections of a line by the character, M being an integer.

4. A character recognition system as recited in claim 2, wherein said first means store for each type of character to be recognized a probability density function which is a function of the random line intersection lengths with the character, and said second means store said probability density function for the scanned character to be recognized as M+1 words, where M is the longest expected intersection length, M being an integer.

5. A character recognition system for recognizing substantially every character in a set of preselected characters, the system comprising:

flying spot scanner means for scanning a character with straight random scanning lines, each straight scanning line being sufficiently long to scan across the entire character from one end thereof to the other;

means for storing for each of a plurality of characters to be recognized a probability density function which is a function of the character and its intersections with said random scanning lines;

means coupled to said flying spot scanner means for obtaining data from the character being scanned by said random scanning lines; and decision means for substantially recognizing said scanned character on the basis of said obtained data and the probability density functions in said means for storing.

6. The arrangement as recited in claim 5 wherein said random straight scanning lines are uniformly distributed over a fixed stationary retina-defining area containing said character.

7. The arrangement as recited in claim 6 wherein said storing means store for each type of character to be recognized a probability density function which is a function of the random line intersection lengths with the character.

8. The arrangement as recited in claim 6 wherein said storing means store for each type of character to be recognized a probability density function which is a function of the number of intersections of the random lines by the character.

9. The arrangement as recited in claim 6 wherein said storing means store for each type of character to be recognized probability density functions which are functions of the random line intersection lengths with the character and the number of intersections of each scanning line with the character.

* * * * *